(12) United States Patent
Sun

(10) Patent No.: US 12,109,506 B1
(45) Date of Patent: Oct. 8, 2024

(54) WATER TOY

(71) Applicant: Furui Zhong, Guangdong (CN)

(72) Inventor: Jianghai Sun, Guangdong (CN)

( * ) Notice: Subject to any disclaimer, the term of this patent is extended or adjusted under 35 U.S.C. 154(b) by 0 days.

(21) Appl. No.: 18/539,553

(22) Filed: Dec. 14, 2023

(30) Foreign Application Priority Data

Jun. 19, 2023 (CN) .......................... 202310732472.5

(51) Int. Cl.
*A63H 23/10* (2006.01)
*A63H 33/26* (2006.01)

(52) U.S. Cl.
CPC ............. *A63H 23/10* (2013.01); *A63H 33/26* (2013.01)

(58) Field of Classification Search
CPC ........ A63H 23/10; A63H 29/24; A63H 33/00; A63H 33/26; H05K 5/06; H05K 5/069
USPC .................. 446/153, 484; 174/50.5; 222/333
See application file for complete search history.

(56) References Cited

U.S. PATENT DOCUMENTS

| | | | | |
|---|---|---|---|---|
| 4,235,378 A * | 11/1980 | Melin | ..................... | A63H 23/10 446/153 |
| 4,239,129 A * | 12/1980 | Esposito | ............... | F41B 9/0018 362/112 |
| 4,540,376 A * | 9/1985 | Turbowitz | ............. | A63H 23/04 446/443 |
| 4,706,848 A * | 11/1987 | D'Andrade | ........... | F41B 9/0037 222/340 |
| 4,750,641 A * | 6/1988 | Chin-Fu | ................ | F41B 9/0037 446/475 |
| 5,263,714 A * | 11/1993 | Rudell | ....................... | A63F 9/00 446/176 |
| 5,348,508 A * | 9/1994 | Garfinkel | ............... | A63H 17/34 40/407 |
| 5,586,688 A * | 12/1996 | Johnson | ................ | F41B 9/0021 200/82 R |
| 6,474,507 B1 * | 11/2002 | Hornsby | ............... | F41B 9/0028 222/113 |
| 6,602,089 B2 * | 8/2003 | Abe | ...................... | H01R 12/675 439/417 |
| 6,793,552 B2 * | 9/2004 | Derrah | ................. | A63H 13/045 446/457 |
| 6,814,634 B2 * | 11/2004 | Roberts | .................. | B63H 11/08 440/38 |
| 6,905,388 B2 * | 6/2005 | Schoonmaker | ........ | A63H 23/10 446/156 |
| 7,497,758 B2 * | 3/2009 | Hamasaki | .............. | A63H 23/04 446/160 |
| 7,927,175 B2 * | 4/2011 | Coffey | .................. | F41B 9/0021 446/153 |

(Continued)

*Primary Examiner* — Alexander R Niconovich

(57) ABSTRACT

A water toy includes a water toy main body. The water toy main body includes a first waterproof integrated box. The first waterproof integrated box is configured to accommodate an electronic element. The first waterproof integrated box includes a first upper shell, a first lower shell, a sealing member, and a waterproof chamber. The first upper shell and the first lower shell are covered with each other. The sealing member is arranged at mounting ports of the first upper shell and the first lower shell. After the first upper shell and the first lower shell are covered with each other, the sealing member seals a gap between the first upper shell and the first lower shell to form the waterproof chamber. The first upper shell and the first lower shell are detachably connected through a clasp.

11 Claims, 10 Drawing Sheets

(56) References Cited

U.S. PATENT DOCUMENTS

| | | | | |
|---|---|---|---|---|
| 8,087,968 B2* | 1/2012 | Amron | B05B 11/1001 | 446/15 |
| 8,315,040 B2* | 11/2012 | Roberts | H01R 4/2429 | 361/728 |
| 8,794,486 B2* | 8/2014 | Wolfinbarger | F41B 9/0071 | 446/153 |
| 8,872,025 B2* | 10/2014 | Tamai | B62D 5/0406 | 361/728 |
| 10,201,106 B2* | 2/2019 | Sprowl | H05K 5/061 | |
| 2005/0035148 A1* | 2/2005 | Zimmerman | F41B 9/0021 | 222/401 |
| 2005/0112990 A1* | 5/2005 | Higashida | A63H 23/08 | 446/161 |
| 2005/0208867 A1* | 9/2005 | Higashida | A63H 23/04 | 446/153 |
| 2009/0247043 A1* | 10/2009 | Liao | B05B 15/00 | 446/405 |
| 2010/0015881 A1* | 1/2010 | Bickmore | A47K 3/001 | 446/153 |
| 2011/0059675 A1* | 3/2011 | Liebling | A63H 23/10 | 446/153 |
| 2011/0287688 A1* | 11/2011 | Hang | A63H 23/10 | 446/153 |
| 2011/0306265 A1* | 12/2011 | Mor | A63H 23/12 | 446/15 |
| 2014/0099855 A1* | 4/2014 | Liberatore | F41B 9/0081 | 446/153 |
| 2015/0190723 A1* | 7/2015 | Liberatore | A63G 19/00 | 446/153 |
| 2015/0343322 A1* | 12/2015 | Beavers | B01F 35/32025 | 446/15 |
| 2016/0050784 A1* | 2/2016 | Ikeda | H05K 5/0056 | 220/3.8 |
| 2022/0168662 A1* | 6/2022 | Kelly | A63J 5/028 | |
| 2023/0124093 A1* | 4/2023 | Simpson | H04R 1/028 | 239/211 |

\* cited by examiner

WATER TOY

CROSS-REFERENCE TO RELATED APPLICATIONS

The application claims priority of Chinese patent application CN2023107324725, filed on Jun. 19, 2023, which is incorporated herein by reference in its entireties.

TECHNICAL FIELD

The present disclosure relates to a water toy, applied to the field of toys.

BACKGROUND

Water toys generally refer to toys that can be played in water. There are two kinds of water toys on the market now. One kind of water toy achieves a water spraying function through hand pressing. This hand pressing type water toy is quite boring, causing low playability and being less fun. This water toy easily makes players feel bored and less interested. The other kind of water toy has an electric water spraying function, which is more interesting than the hand pressing type water toy. However, some water toys with the electric water spraying function are only designed with a spray switch, so that they have a relatively simple function. A multifunctional water toy with electric water spraying is complex in design. An electronic element needs to be arranged inside the water toy, and a circuit and the like needs to be designed. This requires a waterproof design. Therefore, the electronic element may be generally designed in a waterproof chamber. The existing waterproof chambers are all designed in sealed shells and cannot be removed or are inconvenient to remove. Since children have no awareness of protecting the toy when playing with the toy, the toy is easy to damage, and water easily enters the waterproof chamber, or if the spray switch is used frequently, the circuit is also easy to damage. The non-removable sealed shell or the sealed shell that is inconvenient to remove is inconvenient for repair of the water toy.

SUMMARY

In response to the problems described above that the waterproof chambers designed in the multifunctional water toys with electric water spraying in the prior art are all sealed shells that cannot be removed or are inconvenient to remove, so that the electronic elements or circuits of the water toys are damaged, and it is inconvenient to repair the water toy, the present disclosure provides a water toy. The water toy is provided with a first waterproof integrated box; the first waterproof integrated box is configured to accommodate an electronic element; the first waterproof integrated box is composed of a first upper shell, a first lower shell, a sealing member, and a waterproof chamber; the first upper shell and the first lower shell are detachably connected to each other by a clasp; the detachable connection is convenient for opening the first waterproof integrated box and repairing the electronic element. The sealing member seals a gap between the first upper shell and the first lower shell after the first upper shell and the first lower shell are closed, to achieve a waterproof effect, so that a waterproof chamber is formed in the first waterproof integrated box to prevent water from entering the first waterproof integrated box and protect the electronic element.

The technical solution adopted by the present disclosure to solve the technical problem is as follows:

A water toy, wherein the water toy includes a water toy main body; the water toy main body includes a first waterproof integrated box; the first waterproof integrated box is configured to accommodate an electronic element; the first waterproof integrated box includes a first upper shell, a first lower shell, a sealing member, and a waterproof chamber; the first upper shell and the first lower shell are covered with each other; the sealing member is arranged at mounting ports of the first upper shell and the first lower shell; after the first upper shell and the first lower shell are covered with each other, the sealing member seals a gap between the first upper shell and the first lower shell to form the waterproof chamber; and the first upper shell and the first lower shell are detachably connected through a clasp.

Further, a groove is arranged on the first lower shell; the sealing member is arranged in the groove; the first upper shell is provided with a protrusion; the protrusion is inserted into the groove and compresses the sealing member, so that the first upper shell and the first lower shell are hermetically connected to each other; or a groove is arranged on the first upper shell; the sealing member is arranged in the groove; the first lower shell is provided with a protrusion; and the protrusion is inserted into the groove and compresses the sealing member, so that the first upper shell and the first lower shell are hermetically connected to each other.

Further, the water toy further includes a water outlet device and a second connecting component; the water outlet device is communicated to the water toy main body; the water outlet device is connected to the water toy main body through a second connecting component; the second connecting component includes a water pipe, a protective pipe, a first connecting fixing member, and a first fastener; a first end of the water pipe is connected to the water toy main body, and a second end of the water pipe is connected to the water outlet device; the first connecting fixing member sleeves the first end of the water pipe and is arranged inside the water toy main body; the protective pipe sleeves the water pipe and the first connecting fixing member; the first fastener sleeves the protective pipe; the first fastener compresses the protective pipe onto the first connecting fixing member; a first clamping slot is arranged on an outer side surface of the first connecting fixing member; and the first fastener compresses the protective pipe inside the first clamping slot.

Further, the second connecting component further includes a second connecting fixing member and a second fastener; the second connecting fixing member sleeves the second end of the water pipe and is arranged inside the water outlet device; the protective pipe also sleeves the second connecting fixing member; the second fastener sleeves the protective pipe, and the second fastener compresses the protective pipe onto the second connecting fixing member; a second clamping slot is arranged on an outer side surface of the second connecting fixing member; and the second fastener compresses the protective pipe inside the second clamping slot.

Further, the water toy further includes a water volume control switch and a water pumping component; the water toy main body further includes a first shell; the first waterproof integrated box and the water pumping component are arranged inside the first shell; the water volume control switch is arranged on the water outlet device; the water volume control switch is electrically connected to the water pumping component through a first wire; one end of the first wire is connected to the water pumping component; and the first wire passes between the water pipe and the protective pipe and is connected to the water volume control switch.

Further, the water outlet device includes a grip and a water outlet head; the grip is provided with more than one clamping block; the water outlet head is provided with a third clamping slot corresponding to the clamping block; the clamping block is clamped in the third clamping slot; the clamping block is detachably clamped with the third clamping slot; or the water outlet head is provided with more than one clamping block; the grip is provided with a third clamping slot corresponding to the clamping block; the clamping block is clamped in the third clamping slot; and the clamping block is detachably clamped with the third clamping slot.

Further, the clamping block is trapezoidal; the clamping block is provided with a first inclined plane and a second inclined plane; the first inclined plane and the second inclined plane are opposite to each other; and the first inclined plane is arranged in a direction of the third clamping slot.

Further, the water pumping component includes a first control circuit board, a battery, a temperature probe, and a display screen; the first wire, the battery, the temperature probe, and the display screen are all electrically connected to the first control circuit board; the first control circuit board, the battery, and the display screen are all arranged in the first waterproof integrated box; the temperature probe is arranged on an outer side of the first waterproof integrated box; and a temperature detected by the temperature probe is transmitted to the display screen through the first control circuit board, so that the display screen displays temperature information detected by the temperature probe.

Further, the water pumping component further includes a water pump; the water pump is arranged on the outer side of the first waterproof integrated box; a first opening B is arranged on the first waterproof integrated box; a first waterproof sleeve B is arranged at the first opening B; the first waterproof sleeve B seals the first opening B; the water pump is electrically connected to the first control circuit board through a second wire; one end of the second wire is connected to the first control circuit board, and the other end of the second wire is connected to the water pump through the first waterproof sleeve B; and an inner wall of a through hole of the first waterproof sleeve B compresses the second wire.

Further, a first display region is arranged on the first shell; a second display region corresponding to the first display region is arranged on the first waterproof integrated box; and a display surface of the display screen corresponds to the first display region and the second display region, so that the display screen achieves displaying through the second display region and the first display region.

Beneficial effects of the present disclosure are as follows: The present disclosure provides a water toy. The first waterproof integrated box is designed to be a sealed, waterproof, and easily removable structure, which facilitates mounting and repair of the electronic element. The water toy is also designed with the temperature display screen, so that parents can monitor a water temperature in real time when their child plays with the water toy; and the water volume control switch is designed, which improves the fun of playing with the water toy.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Figure 1:
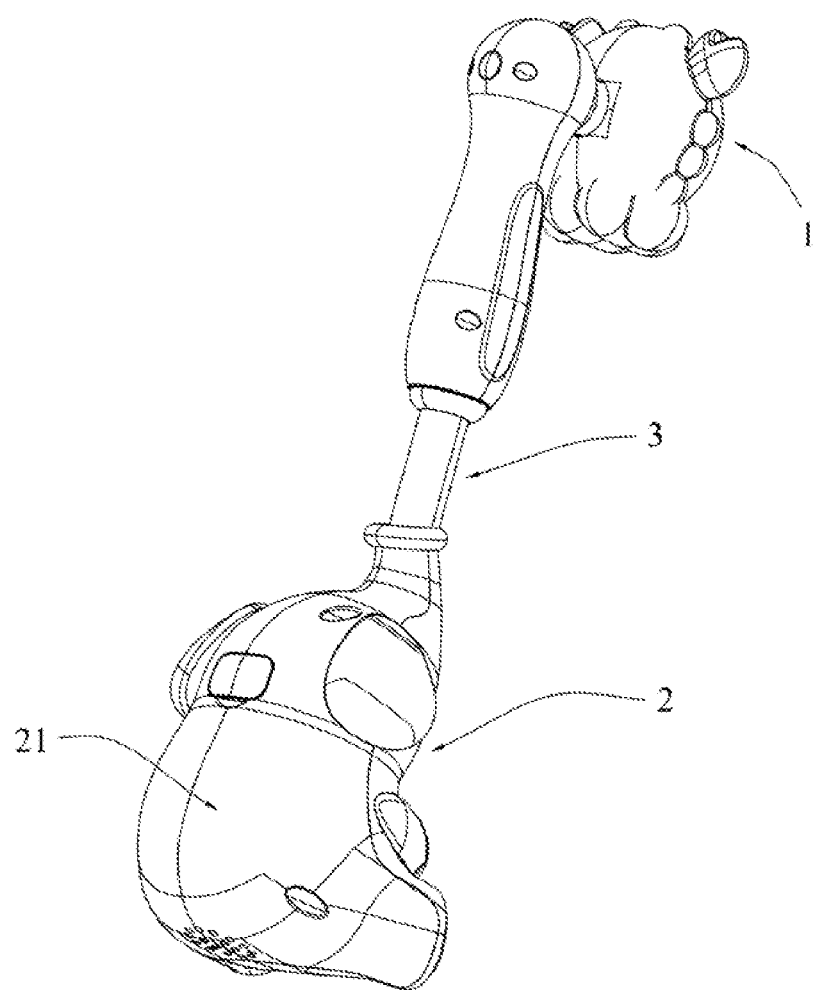
FIG. 1 is a three-dimensional diagram of a water toy according to the present disclosure.
Figure 2:
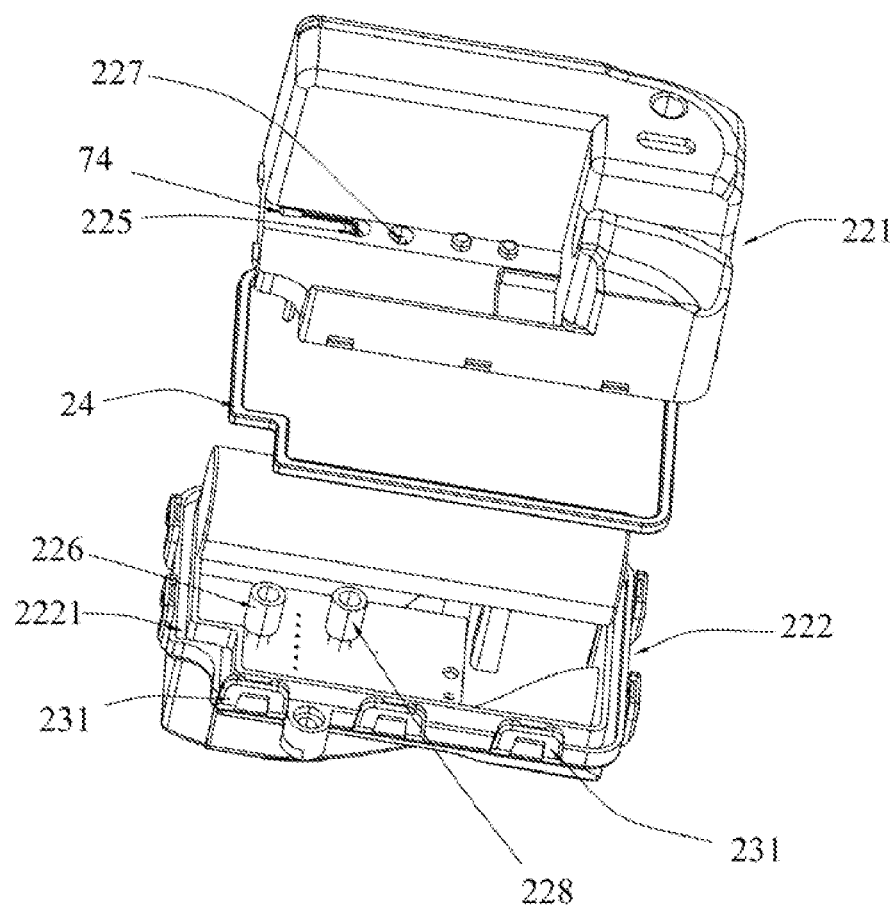
FIG. 2 is an exploded diagram of a first waterproof integrated box according to the present disclosure.

Referring to FIG. 1 to FIG. 10, the present disclosure provides a water toy. As shown in FIG. 2, the water toy includes a water toy main body 2; the water toy main body 2 includes a first waterproof integrated box 22; the first waterproof integrated box 22 is configured to accommodate an electronic element; the first waterproof integrated box 22 includes a first upper shell 221, a first lower shell 222, a sealing member 24, and a waterproof chamber; the first upper shell 221 and the first lower shell 222 are covered with each other; the sealing member 24 is arranged at mounting ports of the first upper shell 221 and the first lower shell 222; after the first upper shell 221 and the first lower shell 222 are covered with each other, the sealing member 24 seals a gap between the first upper shell 221 and the first lower shell 222 to form the waterproof chamber; and the first upper shell 221 and the first lower shell 222 are detachably connected through a clasp 231.

In terms of the structure of the first waterproof integrated box 22, since children have no awareness of protecting the toy when playing with the toy, the toy is easy to damage, and the damage to the toy is possibly caused by an electronic element or poor connection and contact of a circuit. The first waterproof integrated box 22 adopts the detachable design using the clasp, so that it is convenient to open the first waterproof integrated box 22 to repair the electronic element and the circuit. For example, if the first upper shell 221 and the first lower shell 222 are sealed using a screw, a bolt, or other fixing methods, it is inconvenient for assembling and disassembling; it takes time to perform assembling and disassembling; and it is inconvenient to repair the electronic element inside the first waterproof integrated box 22. Therefore, the clasp design is more convenient for assembling and disassembling. The sealing member 24 seals the gap between the first upper shell 221 and the first lower shell 222 after the first upper shell and the first lower shell are covered with each other to achieve a waterproof effect, and the waterproof chamber is formed in the first waterproof integrated box 22 to avoid water from entering the first waterproof integrated box and protect the electronic element.

The above clasp can include more than one first clasp member 231 and a first clamping position 232. The first clasp member 231 is arranged on a periphery of the first upper shell 221; the first clamping position 232 is arranged on a periphery of the first lower shell 222; the first clamping position 232 corresponds to the first clasp member 231; the first clasp member 231 is clamped to the first clamping position 232 to connect the first upper shell 221 with the first lower shell 222; or, the first clasp member 231 is arranged on a periphery of the first lower shell 222; the first clamping position 232 is arranged on a periphery of the first upper shell 221; the first clamping position 232 corresponds to the first clasp member 231; and the first clasp member 231 is clamped to the first clamping position 232 to connect the first upper shell 221 with the first lower shell 222.

Figure 3:
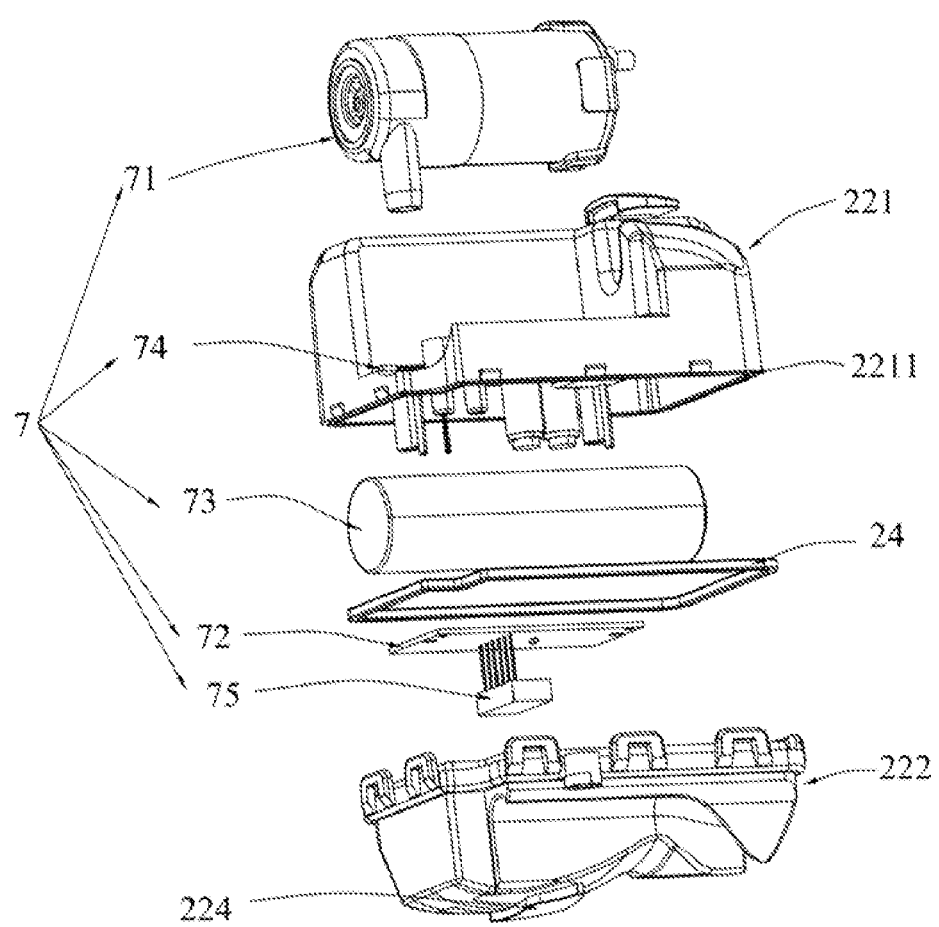
FIG. 3 is an exploded diagram of a first waterproof integrated box according to the present disclosure.

In this embodiment, as shown in FIG. 3, a groove 2221 is arranged on the first lower shell 222; the sealing member 24 is arranged in the groove 2221; the first upper shell 221 is provided with a protrusion 2211; the protrusion 2211 is inserted into the groove 2221 and compresses the sealing member 24, so that the first upper shell 221 and the first lower shell 222 are hermetically connected to each other; or a groove 2221 is arranged on the first upper shell 221; the sealing member 24 is arranged in the groove 2221; the first lower shell 222 is provided with a protrusion 2211; and the protrusion 2211 is inserted into the groove 2221 and compresses the sealing member 24, so that the first upper shell 221 and the first lower shell 222 are hermetically connected to each other. By the arrangement of the groove 2221 that accommodates the sealing member 24, the protrusion 2211 compresses the sealing member 24, so that the waterproof chamber in the first waterproof integrated box 22 has higher waterproof performance. When children plays with the water toy, water will not seep into the waterproof chamber, which better improves the waterproof performance and improves the quality of the water toy. The sealing member 24 here can use a sealing ring, plastic, or rubber. The sealing ring is preferred because it is convenient to mount. The sealing ring preferably adopts, but is not limited to, a SIL silicone rubber sealing ring or a soft silicone sealing ring. The sealing ring can be set according to a requirement of a manufacturer as long as it mainly achieves a sealing effect.

An inner side edge of the groove 2221 is preferably higher than an outer side edge of the groove 2221. Firstly, this setting facilitates the covering of the first upper shell 221 and the first lower shell 222. Secondly, this setting provides better waterproofing performance.

Figure 4:
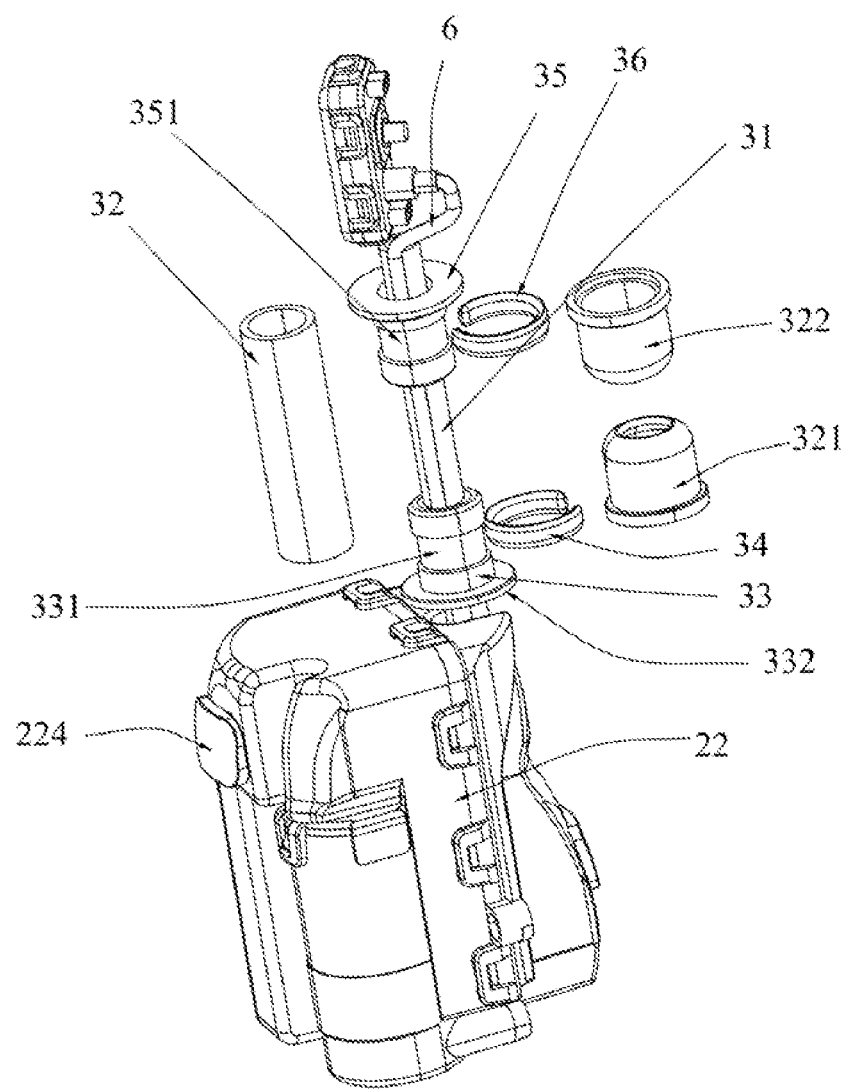
FIG. 4 is a schematic diagram of an internal structure of a water toy according to the present disclosure.
Figure 5:
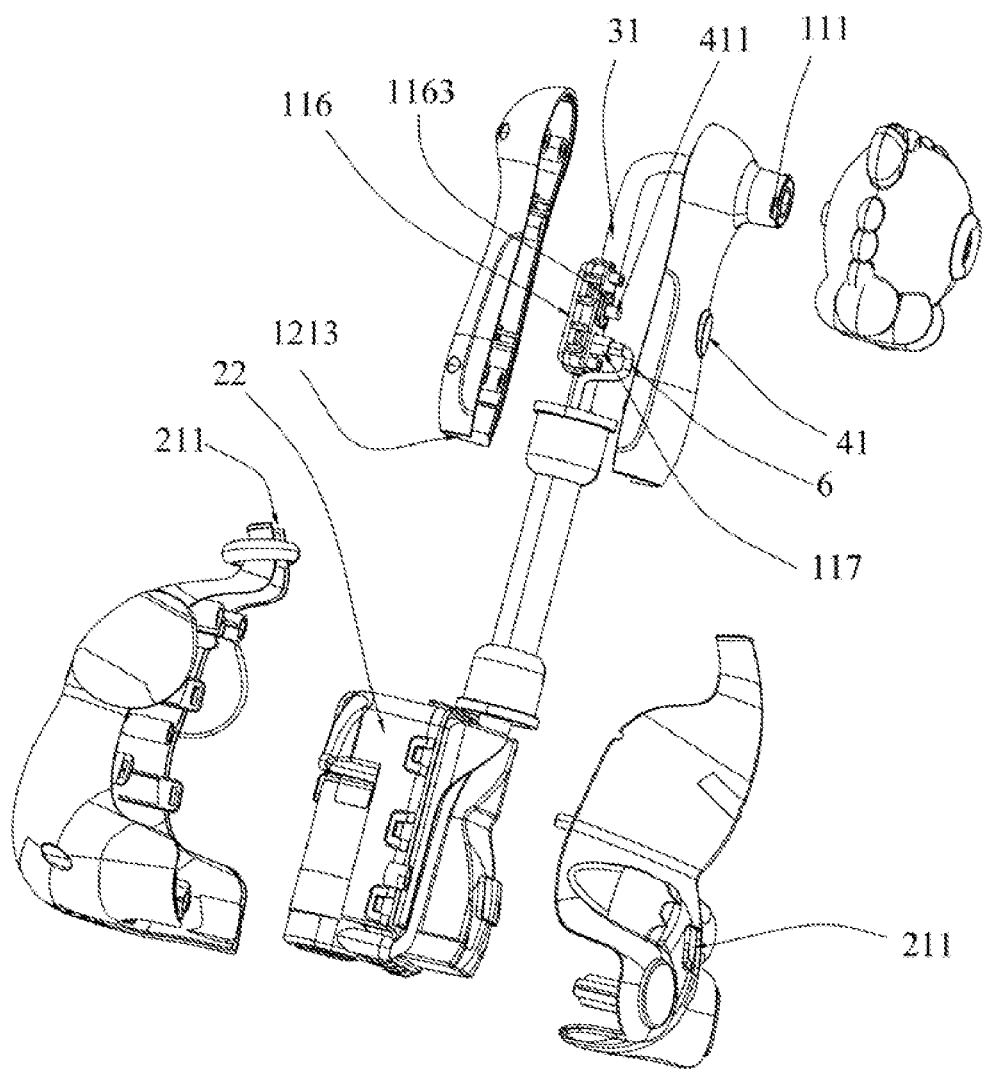
FIG. 5 is an exploded diagram of a water toy according to the present disclosure.
Figure 6:
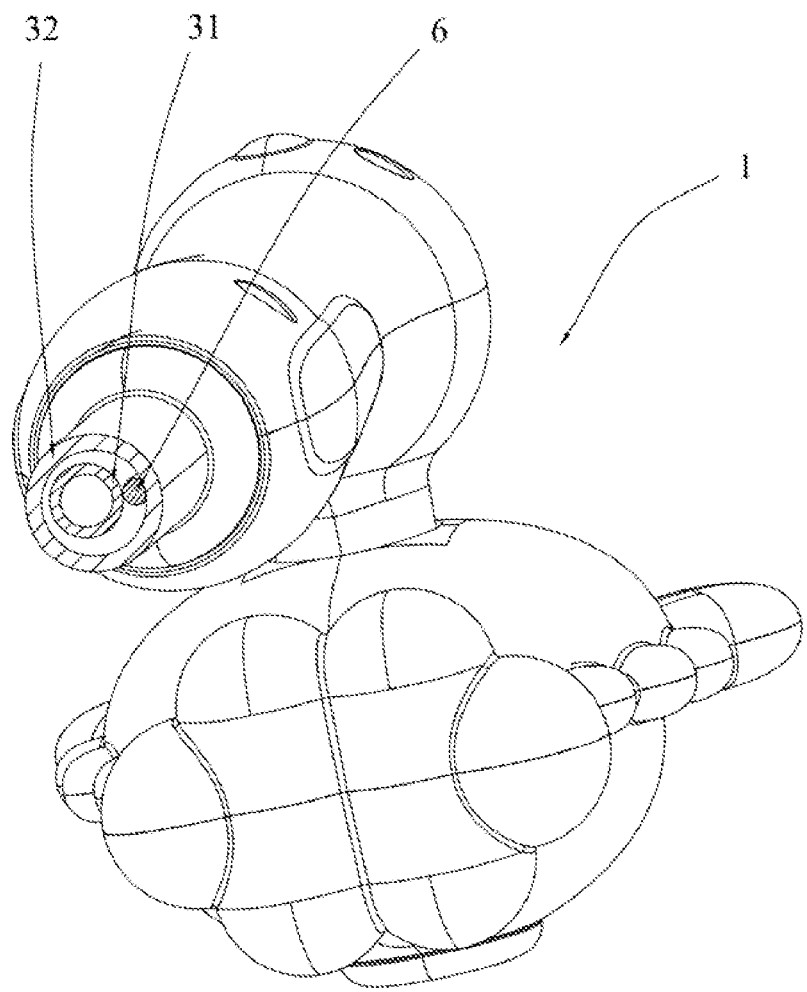
FIG. 6 is a schematic diagram of a mounting structure of a first wire and a second connecting component according to the present disclosure.
Figure 7:
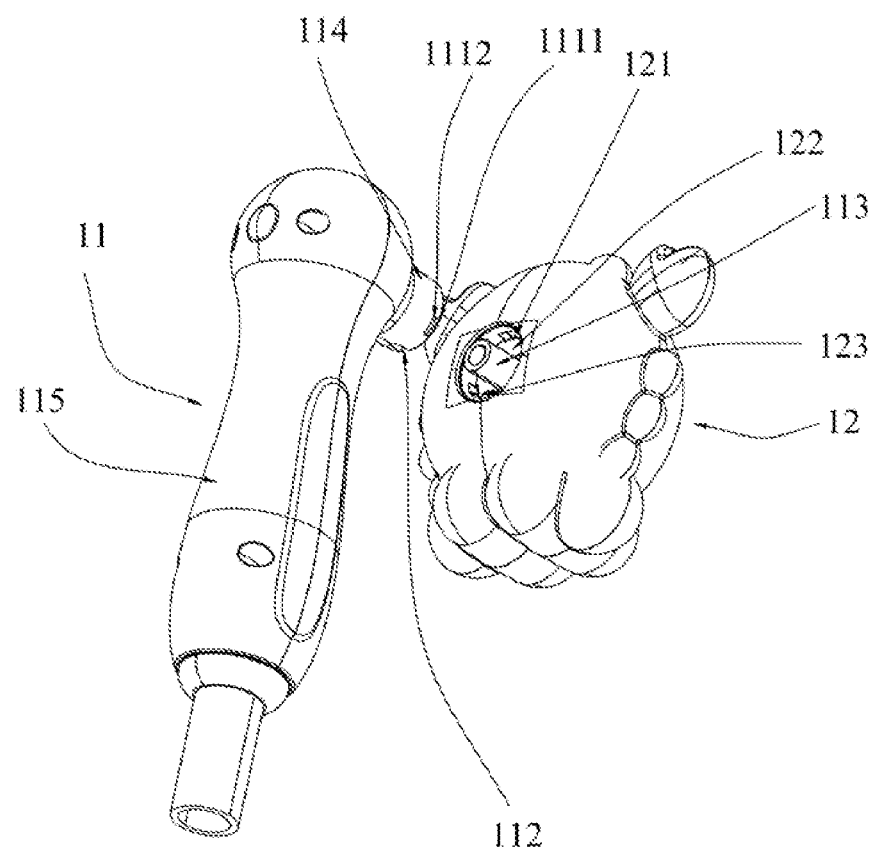
FIG. 7 is a schematic structural diagram of connection of a water outlet device according to the present disclosure.
Figure 8:
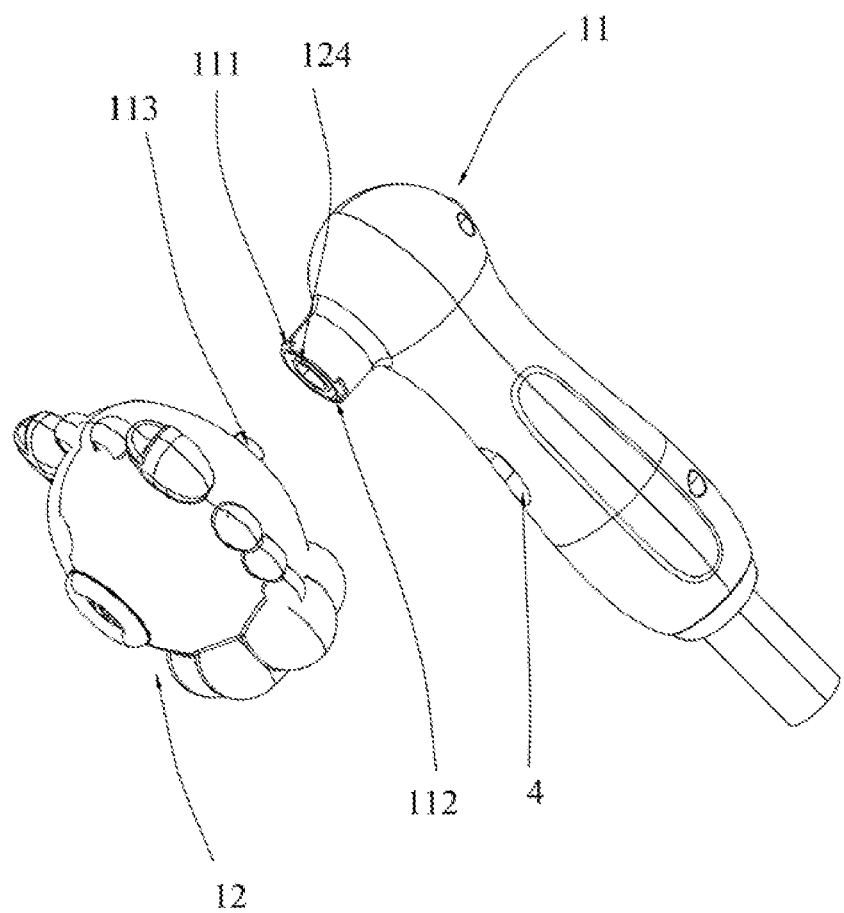
FIG. 8 is a schematic structural diagram of connection of a water outlet device according to the present disclosure.
Figure 9:
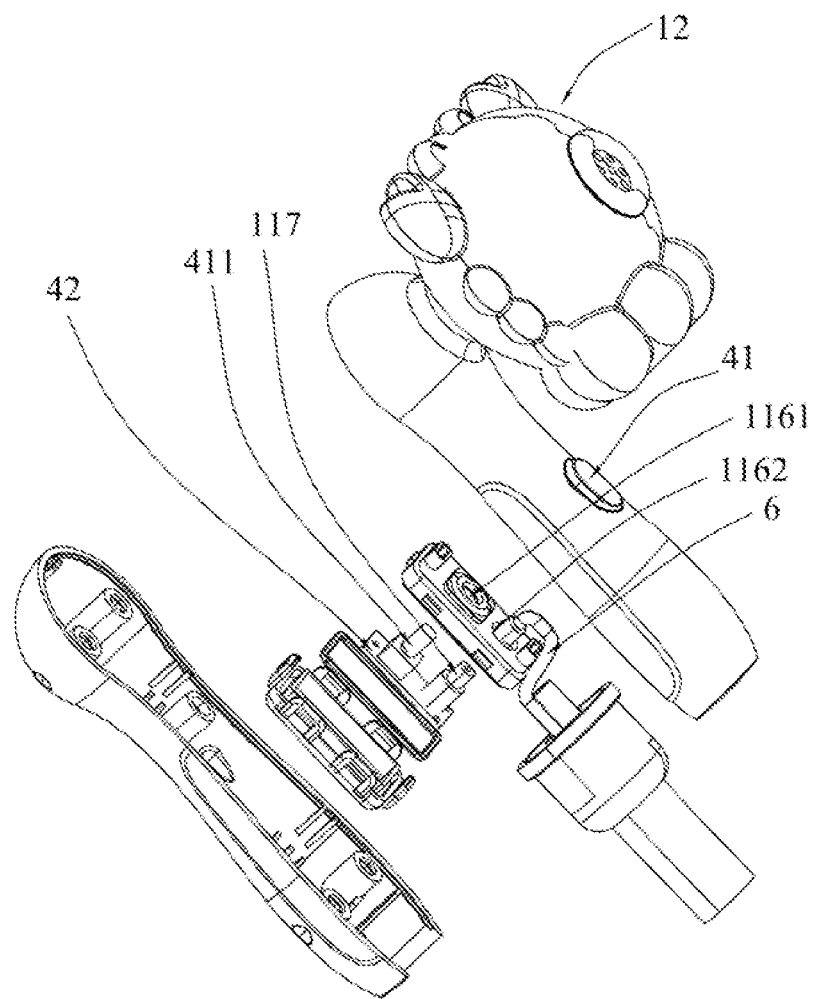
FIG. 9 is an exploded diagram of a water outlet device according to the present disclosure.
Figure 10:
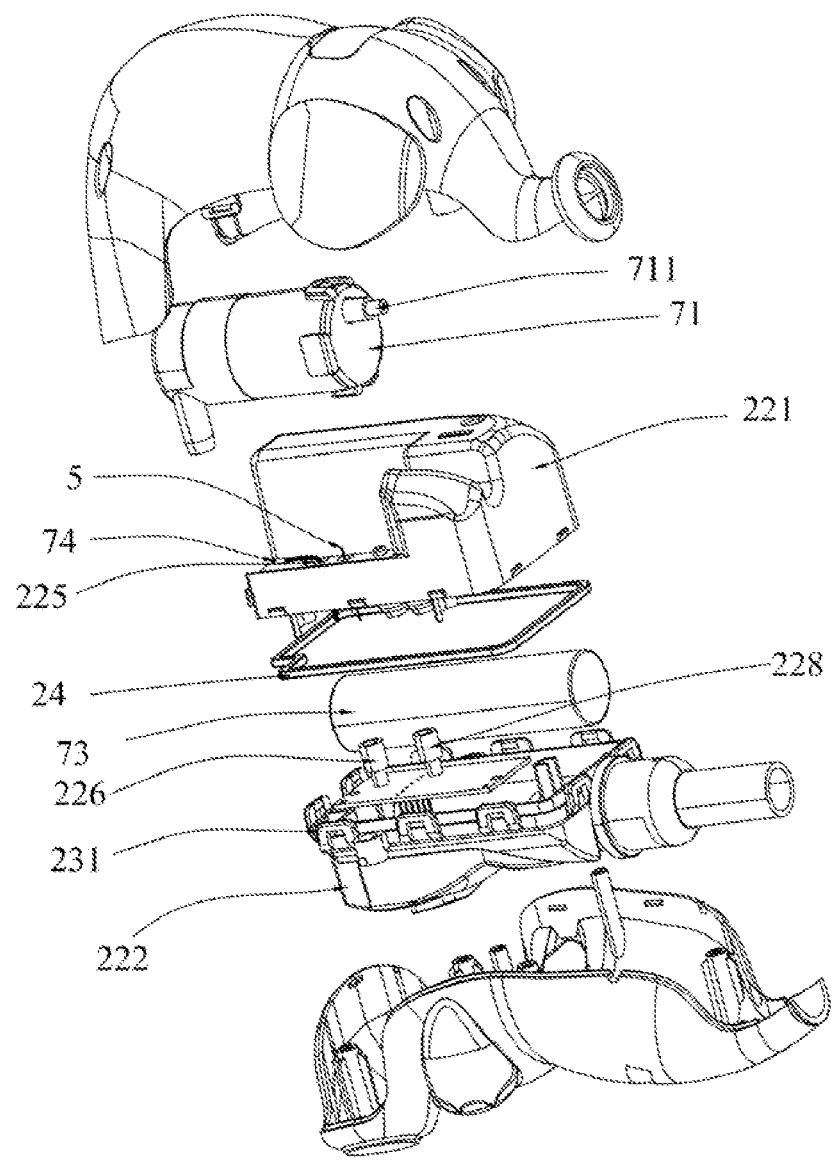
FIG. 10 is an exploded diagram of a water toy main body according to the present disclosure.

In this embodiment, the water toy further includes a water outlet device 1 and a second connecting component 3; and the water outlet device 1 is communicated to the water toy main body 2. The water outlet device 1 here can be a shower head, a shower nozzle, or another water outlet device. The shower head is preferred here, which is more interesting. The water outlet device 1 is communicated to the water toy main body 2 through the second connecting component 3. The second connecting component 3 can be fixed or detachable. The second connecting component 3 in this embodiment is preferably detachable, which facilitates assembling. As shown in FIG. 4, the second connecting component 3 includes a water pipe 31, a protective pipe 32, a first connecting fixing member 33, and a first fastener 34; a first end of the water pipe 31 is connected to the water toy main body 2, and a second end of the water pipe 31 is connected to the water outlet device 1; the first connecting fixing member 33 sleeves the first end of the water pipe 31 and is arranged inside the water toy main body 2; the protective pipe 32 sleeves the water pipe 31 and the first connecting fixing member 33; the first fastener 34 sleeves the protective pipe 32; the first fastener 34 compresses the protective pipe 32 onto the first connecting fixing member 33; a first clamping slot 331 is arranged on an outer side surface of the first connecting fixing member 33; and the first fastener 34 compresses the protective pipe 32 inside the first clamping slot 331. During playing with the water toy, the water outlet device 1 sprays water, and the water is pumped through a water pumping device arranged in the water toy main body 2 and then flows out through the water pipe 31 via the water outlet device 1. The first connecting fixing member 33 here is made of a soft material, such as rubber. In this way, when the first fastener 34 is used to compress the protective pipe to the first connecting fixing member 33, the first fastener 34 can also compress the first connecting fixing member 33 to the water pipe, so that it is difficult for the water to seep into a space between the protective pipe and the water pipe, and the water will not be accumulated. In this way, if a wire passes through the space between the protective pipe and the water pipe, the wire is protected from being soaked in the water, and the lifespan of the wire is prolonged. Furthermore, the water will not penetrate into the water outlet device to damage other electronic elements and the like. By the arrangement of the first clamping slot 331 in the implementation, the first connecting fixing member 33 is connected to the protective pipe, and the first fastener 34 compresses the protective pipe more tightly, which achieves a better anti-falling effect. The first fastener 34 here uses an elastic snap ring with an opening for easy assembling and disassembling. The protective pipe here is made of a soft material.

In this embodiment, the second connecting component 3 further includes a second connecting fixing member 35 and a second fastener 36; the second connecting fixing member 35 sleeves the second end of the water pipe 31 and is arranged inside the water outlet device 1; the protective pipe 32 also sleeves the second connecting fixing member 35; the second fastener 36 sleeves the protective pipe 32, and the second fastener 36 compresses the protective pipe 32 onto the second connecting fixing member 35; a second clamping slot 351 is arranged on an outer side surface of the second connecting fixing member 35; and the second fastener 36 compresses the protective pipe 32 inside the second clamping slot 351. The arrangement of the second connecting fixing member 35 and the second fastener 36 are more convenient for assembling of the water outlet device and the water toy main body 2. When the second fastener 36 is used to compress the protective pipe to the second connecting fixing member 35, the second fastener 36 can also compress the second connecting fixing member 35 to the water pipe, so that it is difficult for the water to seep into a space between the protective pipe and the water pipe, and the water will not be accumulated. In this way, if a wire passes through the space between the protective pipe and the water pipe, the wire is protected from being soaked in the water, and the lifespan of the wire is prolonged. Furthermore, the water will not penetrate into the water outlet device to damage other electronic elements and the like. By the arrangement of the second clamping slot 351 in this embodiment, the second connecting fixing member 35 is connected to the protective pipe, and the second fastener 36 compresses the protective pipe more tightly, which achieves a better anti-falling effect. The second fastener 36 here uses an elastic snap ring with an opening for easier assembling. The assembling time is saved.

In this embodiment, the water toy further includes a water volume control switch 4 and a water pumping component 7; the water toy main body further includes a first shell 21; the first waterproof integrated box 22 and the water pumping component 7 are arranged inside the first shell 21; the water volume control switch 4 is arranged on the water outlet device 1; the water volume control switch 4 is electrically connected to the water pumping component 7 through a first wire 6; one end of the first wire 6 is connected to the water pumping component 7; and the first wire 6 passes between the water pipe 31 and the protective pipe 32 and is connected to the water volume control switch 4. That is, the first wire 6 will not be soaked in the water. This water isolation design greatly improves the safety of the water toy. The arrangement of the water volume control switch 4 increases the fun of the toy and reduces the boring feeling. The water volume control switch can be configured with a plurality of levels, for example, there are a total of three levels. When the water volume control switch is pressed for the first time, a small water volume is achieved; when the water volume control switch is pressed for the second time, a medium water volume is achieved; when the water volume control switch is pressed for the second time, a large water volume is achieved; when the water volume control switch is pressed for the fourth time, the water volume control switch is turned off; and the operations are performed cyclically. However, the water volume control switch is not limited to three levels.

In this embodiment, the water outlet device 1 includes a grip 11 and a water outlet head 12. The grip 11 and the water outlet head 12 are detachably connected. The grip 1 is provided with more than one clamping block 111; the water outlet head 12 is provided with a third clamping slot 121 corresponding to the clamping block 111; and the clamping block 111 is clamped in the third clamping slot 121. The grip 11 is connected to the water outlet head 12; the water outlet head 12 is provided with more than one clamping block 111, and the grip 1 is provided with a third clamping slot 121 corresponding to the clamping block 111; and the clamping block 111 is clamped in the third clamping slot 121. The grip 11 is connected to the water outlet head 12, so that the water outlet head 12 can be removed and replaced, such as a sun-shaped water outlet head. If children do not like this water outlet head, the water outlet head can be replaced with an animal type water outlet head, which can still increase the fun of playing and increase children's knowledge of things.

A mounting slot 122 can be arranged on a back portion of the water outlet head 12. The third clamping slot 121 is arranged in the mounting slot 122. One end of the grip 11 is inserted into the mounting slot 122, and the clamping block 111 is clamped in the third clamping slot 121. A positioning sliding block 123 is arranged inside the mounting slot 122; the positioning sliding block 123 is arranged on an inner side edge of the mounting slot 122. The end of the grip 11 connected to the water outlet head 12 is provided with a bayonet 112 corresponding to the positioning sliding block 123. The bayonet 112 is clamped with the positioning sliding block 123. A hollow positioning column 124 is also arranged inside the mounting slot 122. The hollow positioning column 124 is communicated to an inside of the water outlet head 12. The end of the grip 11 connected to the water outlet head 12 is provided with a hollow guide column 113 corresponding to the hollow positioning column 124. The hollow guide column 113 is communicated to the water pipe 31. A surrounding wall 114 is arranged on a periphery of the hollow guide column 113. A space exists between the surrounding wall 114 and the hollow guide column 113, and the clamping block 111 is arranged on an outer side of the surrounding wall 114. The bayonet 112 is arranged on the surrounding wall 114. When the grip 11 and the water outlet head 12 are assembled, the bayonet 112 is aligned with the positioning sliding block 123, the hollow guide column 113 is aligned with the hollow positioning column 124, the bayonet 112 is clamped on the positioning sliding block 123, the hollow guide column 113 is inserted onto the hollow positioning column 124, and the clamping block 111 is clamped in the third clamping slot 121, so as to connect the grip 11 with the water outlet head 12. The surrounding wall 114, the hollow guide column 113, and the grip 11 are integrally molded, and the hollow positioning column 124 and the water outlet head 12 are integrally molded. Due to the arrangement of the positioning sliding block 123, the bayonet 112, the hollow guide column 113, and the hollow positioning column 124, it is more convenient for replacement of the water outlet head. In this way, when children play with the water toy, parents can replace the water outlet head that their children like, thus improving the use experience of a customer.

The grip 11 includes a second shell 115 and a second waterproof integrated box 116. The second waterproof integrated box 116 is arranged inside the second shell 115. The water volume control switch 4 includes a control button 41 and a second control circuit board 42. The second control circuit board 42 is arranged inside the second waterproof integrated box 116. The control button 41 is arranged on the second shell 115. The control button 41 is electrically connected to the second control circuit board 42. The first wire 6 is electrically connected to the second control circuit board 42. The second waterproof integrated box 116 is provided with a second opening A1161 and a second opening B1162. The control button 41 is electrically connected to the second control circuit board 42 through a sensing element 411. One end of the sensing element 411 is connected to the second control circuit board 42 and is arranged inside the second waterproof integrated box 116. The other end of the sensing element 411 extends out of the second waterproof integrated box 116 through the second opening A1161 and is connected to the control button 41. A sealing ring 1163 is arranged at the second opening A1161. The sealing ring 1163 seals the second opening A1161. The first wire 6 is electrically connected to the second control circuit board 42 through the second opening B1162. A second waterproof sleeve 117 is arranged at a connection between the first wire 6 and the second control circuit board 42. The second waterproof sleeve 117 sleeves the first wire 6. Furthermore, one end of the second waterproof sleeve 117 is fixedly arranged on the second control circuit board 42, and the other end of the second waterproof sleeve 117 seals the second opening B1162. The second waterproof sleeve 117 is in interference fit with the first wire 6. By the use of the second waterproof sleeve 117, it is convenient for mounting and achieves better airtightness. The design of both the sealing ring 1163 and the second waterproof sleeve 117 is to improve the airtightness of the second waterproof integrated box 116. The second waterproof sleeve 117 is made of a soft rubber material, which is non-toxic and harmless and protects the health of children.

The second connecting component 3 in this embodiment further includes a first anti-falling sleeve 321 and a second anti-falling sleeve 322. One end of the protective pipe 32 is arranged inside the first shell 21, and the other end of the protective pipe 32 is arranged inside the second shell. An outer side of the protective pipe 32 is sleeved with the first anti-falling sleeve 321. The first anti-falling sleeve 321 is arranged between the first shell 21 and the protective pipe 32, and is clamped at the first opening 211 of the first shell 21. The outer side of the protective pipe 32 is also sleeved with the second anti-falling sleeve 322. The second anti-falling sleeve 322 is arranged between the second shell and the protective pipe 32, and is clamped at a second opening 1213 of the second shell, which is mainly to prevent the connecting component from falling out of the first shell or the second shell. During the arrangement of the anti-falling sleeves, it is preferred to arrange a stop piece on the connecting fixing member to achieve a better anti-falling effect, for example, a stop piece 332 as shown in FIG. 4.

The structural design of the second waterproof integrated box 116 is consistent with that of the first waterproof integrated box, each of which is composed of the upper shell, the lower shell, the sealing member, and the waterproof chamber. The upper shell is detachably connected to the lower shell through a clasp. A groove is arranged on the lower shell. The sealing member is arranged in the groove. The upper shell is provided with a protrusion. The protrusion compresses the sealing member. In this way, the waterproof performance is better, and an electronic element arranged in the second waterproof integrated box 116 is better protected.

In this embodiment, the clamping block 111 is trapezoidal; the clamping block 111 is provided with a first inclined plane 1111 and a second inclined plane 1112; the first inclined plane 1111 and the second inclined plane 1112 are opposite to each other; and the first inclined plane 1111 is arranged in a direction of the third clamping slot 121. By the arrangement of the first inclined plane 1111 and the second inclined plane 1112, the water outlet head is more convenient to assemble and disassemble, without being stuck.

In this embodiment, the water pumping component 7 includes a first control circuit board 72, a battery 73, a temperature probe 74, and a display screen 75; the first wire 6, the battery 73, the temperature probe 74, and the display screen 75 are all electrically connected to the first control circuit board 72; the first control circuit board 72, the battery 73, and the display screen 75 are all arranged in the first waterproof integrated box 22; the temperature probe 74 is arranged on an outer side of the first waterproof integrated box 22 or can be fixedly arranged on the outer side of the first waterproof integrated box 22; temperature detected by the temperature probe 74 is transmitted to the display screen 75 through the first control circuit board 72, so that the display screen 75 displays temperature information detected by the temperature probe 74. Parents can monitor the temperature of the water in real time. If the water is too cold, children are more likely to catch a cold and get sick. If the water is too hot, children may be scalded. However, adults and children have different sensible temperatures, so it is very important to set temperatures and monitor the temperatures in real time. This improves the user experience. When children are curious about the temperature, parents can patiently explain it to them and popularize knowledge to children. This also improves the fun of playing with the water toy.

In this embodiment, the water pumping component 7 further includes a water pump 71; the water pump 71 is arranged on the outer side of the first waterproof integrated box 22; a first opening B 227 is arranged on the first waterproof integrated box 22; a first waterproof sleeve B 228 is arranged at the first opening B 227; the first waterproof sleeve B 228 seals the first opening B 227; the water pump 71 is electrically connected to the first control circuit board 72 through a second wire 5; one end of the second wire 5 is connected to the first control circuit board 72, and the other end of the second wire 5 is connected to the water pump 71 through the first waterproof sleeve B 228; and an inner wall of a through hole of the first waterproof sleeve B 228 compresses the second wire 5.

The first waterproof sleeve B 228 seals the first opening B 227, and the through hole of the first waterproof sleeve B228 can allow the second wire 5 to pass through. After the second wire 5 passes through the through hole, the first waterproof sleeve B228 compresses the second wire 5, so that the through hole of the first waterproof sleeve B228 is in a sealed state. The first opening B 227 is sealed through the first waterproof sleeve B228, the second wire 5 passes through the first waterproof sleeve B 228, and the first waterproof sleeve B 228 compresses the first opening B 227 and the second wire 5, so that the first waterproof sleeve B 228 is easy to assemble and has a good waterproof effect. This prolongs the lifespan of the water toy and improves the use experience of the customer.

One end of the second wire 5 is configured to be connected to a second electronic element group inside the water pump 71. A first groove is arranged on an outer wall of the water pump 71. A first mounting hole is arranged in the first groove. A first mounting column is arranged at the first mounting hole, and the first mounting column is located in the first groove. The first mounting column is integrally molded with the water pump 71. A first through hole is formed in the first mounting column. The first through hole penetrates through the first mounting column. The first through hole is internally communicated to the water pump 71. The first mounting column is sleeved with a third waterproof sleeve 711. The third waterproof sleeve 711 is provided with a second through hole. The second through hole is communicated to the first through hole. One end of the third waterproof sleeve 711 sleeves the first mounting column and resists against a bottom wall of the first groove. One end of the second wire 5 is threaded into the water pump via the second through hole and the first through hole in sequence and is connected to the second electronic element group in the water pump 71, and an inner wall of the second through hole compresses the second wire 5.

The first waterproof sleeve B 228 is in interference fit with both the third waterproof sleeve 711 and the second wire 5 to seal the second wire 5 with the first opening B227 and the first mounting hole, which prevents the water from seeping into the first integrated box and the water pump and improves the safety. Overall speaking, by the arrangement of the first waterproof sleeve B 228 and the third waterproof sleeve 711, the waterproof performance is better, so that playing with the water toy is safer. The first waterproof sleeve B 228 and the third waterproof sleeve 711 are made of soft rubber materials which are non-toxic and harmless and protect the health of children. The first waterproof sleeve B 228 improves the waterproof performance of the waterproof integrated box, and the soft rubber material is convenient to adjust to seal the first opening B 227. The third waterproof sleeve 711 is made of a soft rubber material which is convenient to adjust to seal a connection between the second wire 5 and the water pump 71, thus preventing a failure of powering on and damage to the water toy due to water contact.

In this embodiment, a first display region 211 is arranged on the first shell 21; a second display region 224 corresponding to the first display region 211 is arranged on the first waterproof integrated box 22; and a display surface of the display screen 75 corresponds to the first display region 211 and the second display region 224, so that the display screen 75 achieves displaying through the second display region 224 and the first display region 211. A temperature on the display screen 75 can be clearly displayed through the second display region 224 and the first display region 211.

The first waterproof integrated box 22 is provided with a first opening A 225, and the temperature probe 74 is electrically connected to the first control circuit board 72 through a third wire. One end of the third wire is connected to the first control circuit board 72, and the other end of the third wire extends out of the first waterproof integrated box 22 through the first opening A 225 and is arranged on the outer side of the first waterproof integrated box 22 or can be directly fixed on the outer side of the waterproof integrated box 22 to avoid wire enwinding and damage to line connection. This also improves the safety. The first opening A 225 is provided with a first waterproof sleeve A 226. The first waterproof sleeve A 226 sleeves the third wire, and the first opening A 225 is sealed. By the arrangement of the first waterproof sleeve A 226, the waterproof performance and safety of the first waterproof integrated box 22 are improved. The first waterproof sleeve A 226 is made of a soft rubber material, which is non-toxic and harmless and protects the health of children. The first waterproof sleeve A 226 improves the waterproof performance of the waterproof integrated box, and the soft rubber material is convenient to adjust to seal the first opening A 225.

In this embodiment, the water toy further includes a charging port. The charging port is connected to the battery. A third opening is arranged on the first shell, and the charging port corresponds to the third opening. A sealing cover that can seal the third opening is arranged at the third opening.

Overall speaking, the water toy in this embodiment has high safety, good waterproof performance, and a simple structure. Due to the multifunctional settings of the water volume control switch, temperature display, and the replaceable water outlet head, the water toy is fun, and the user experience is improved.

The above are only the preferred embodiments of this application and are not intended to limit this application. For those skilled in the art, this application may have various modifications and variations. Any modifications, equivalent replacements, improvements and the like made within the spirit and principle of this application shall fall within the scope of protection of this application.

What is claimed is:

1. A water toy, wherein the water toy comprises a water toy main body; the water toy main body comprises a first waterproof integrated box; the first waterproof integrated box is configured to accommodate an electronic element; the first waterproof integrated box comprises a first upper shell, a first lower shell, a sealing member, and a waterproof chamber; the first upper shell and the first lower shell are covered with each other; the sealing member is arranged at mounting ports of the first upper shell and the first lower shell; after the first upper shell and the first lower shell are covered with each other, the sealing member seals a gap between the first upper shell and the first lower shell to form the waterproof chamber; and the first upper shell and the first lower shell are detachably connected through a clasp;

wherein the water toy further comprises a water outlet device and a second connecting component; the water outlet device is communicated to the water toy main body; the water outlet device is connected to the water toy main body through the second connecting component; the second connecting component comprises a water pipe, a protective pipe, a first connecting fixing member, and a first fastener; a first end of the water pipe is connected to the water toy main body, and a second end of the water pipe is connected to the water outlet device; the first connecting fixing member sleeves the first end of the water pipe and is arranged inside the water toy main body; the protective pipe sleeves the water pipe and the first connecting fixing member; the first fastener sleeves the protective pipe; the first fastener compresses the protective pipe onto the first connecting fixing member; a first clamping slot is arranged on an outer side surface of the first connecting fixing member; and the first fastener compresses the protective pipe inside the first clamping slot.

2. The water toy according to claim 1, wherein a groove is arranged on the first lower shell; the sealing member is arranged in the groove; the first upper shell is provided with a protrusion; the protrusion is inserted into the groove and compresses the sealing member, so that the first upper shell and the first lower shell are hermetically connected to each other; or a groove is arranged on the first upper shell; the sealing member is arranged in the groove; the first lower shell is provided with a protrusion; and the protrusion is inserted into the groove and compresses the sealing member, so that the first upper shell and the first lower shell are hermetically connected to each other.

3. The water toy according to claim 1, wherein the second connecting component further comprises a second connecting fixing member and a second fastener; the second connecting fixing member sleeves the second end of the water pipe and is arranged inside the water outlet device; the protective pipe also sleeves the second connecting fixing member; the second fastener sleeves the protective pipe, and the second fastener compresses the protective pipe onto the second connecting fixing member; a second clamping slot is arranged on an outer side surface of the second connecting fixing member; and the second fastener compresses the protective pipe inside the second clamping slot.

4. The water toy according to claim 1, wherein the water toy further comprises a water volume control switch and a water pumping component; the water toy main body further comprises a first shell; the first waterproof integrated box and the water pumping component are arranged inside the first shell; the water volume control switch is arranged on the water outlet device; the water volume control switch is electrically connected to the water pumping component through a first wire; one end of the first wire is connected to the water pumping component; and the first wire passes between the water pipe and the protective pipe and is connected to the water volume control switch.

5. The water toy according to claim 4, wherein the water pumping component comprises a first control circuit board, a battery, a temperature probe, and a display screen; the first wire, the battery, the temperature probe, and the display screen are all electrically connected to the first control circuit board; the first control circuit board, the battery, and the display screen are all arranged in the first waterproof integrated box; the temperature probe is arranged on an outer side of the first waterproof integrated box; and a temperature detected by the temperature probe is transmitted to the display screen through the first control circuit board, so that the display screen displays temperature information detected by the temperature probe.

6. The water toy according to claim 5, wherein the water pumping component further comprises a water pump; the water pump is arranged on the outer side of the first waterproof integrated box; a first opening B is arranged on the first waterproof integrated box; a first waterproof sleeve B is arranged at the first opening B; the first waterproof sleeve B seals the first opening B; the water pump is electrically connected to the first control circuit board through a second wire; a first end of the second wire is connected to the first control circuit board, and a second end of the second wire is connected to the water pump through the first waterproof sleeve B; and an inner wall of a through hole of the first waterproof sleeve B compresses the second wire.

7. The water toy according to claim 5, wherein a first display region is arranged on the first shell; a second display region corresponding to the first display region is arranged on the first waterproof integrated box; and a display surface of the display screen corresponds to the first display region and the second display region, so that the display screen achieves displaying through the second display region and the first display region.

8. The water toy according to claim 1, wherein the water outlet device comprises a grip and a water outlet head; the grip is provided with more than one clamping block; the water outlet head is provided with a third clamping slot corresponding to the clamping block; the clamping block is clamped in the third clamping slot; the clamping block is detachably clamped with the third clamping slot; or the water outlet head is provided with more than one clamping block; the grip is provided with a third clamping slot corresponding to the clamping block; the clamping block is clamped in the third clamping slot; and the clamping block is detachably clamped with the third clamping slot.

9. The water toy according to claim 8, wherein the clamping block is trapezoidal; the clamping block is provided with a first inclined plane and a second inclined plane; the first inclined plane and the second inclined plane are opposite to each other; and the first inclined plane is arranged in a direction of the third clamping slot.

10. A water toy, comprising a water toy main body;
wherein the water toy main body comprises a first waterproof integrated box; the first waterproof integrated box is configured to accommodate an electronic element;
the first waterproof integrated box comprises a first upper shell, a first lower shell, a sealing member, and a waterproof chamber; the first upper shell and the first lower shell are covered with each other; the sealing member is arranged at mounting ports of the first upper shell and the first lower shell; after the first upper shell and the first lower shell are covered with each other, the sealing member seals a gap between the first upper shell and the first lower shell to form the waterproof chamber;
wherein the water toy further comprises a water outlet device and a second connecting component; the water outlet device is communicated to the water toy main body; the water outlet device is connected to the water toy main body through the second connecting component; the second connecting component comprises a water pipe, a protective pipe, a first connecting fixing member, and a first fastener; a first end of the water pipe is connected to the water toy main body, and a second end of the water pipe is connected to the water outlet device; the first connecting fixing member sleeves the first end of the water pipe and is arranged inside the water toy main body; the protective pipe sleeves the water pipe and the first connecting fixing member; the first fastener sleeves the protective pipe; the first fastener compresses the protective pipe onto the first connecting fixing member; a first clamping slot is arranged on an outer side surface of the first connecting fixing member; and the first fastener compresses the protective pipe inside the first clamping slot.

11. The water toy according to claim 10, wherein the second connecting component further comprises a second connecting fixing member and a second fastener; the second connecting fixing member sleeves the second end of the water pipe and is arranged inside the water outlet device; the protective pipe also sleeves the second connecting fixing member; the second fastener sleeves the protective pipe, and the second fastener compresses the protective pipe onto the second connecting fixing member; a second clamping slot is arranged on an outer side surface of the second connecting fixing member; and the second fastener compresses the protective pipe inside the second clamping slot.

\* \* \* \* \*